(12) United States Patent
Colledge et al.

(10) Patent No.: US 7,895,221 B2
(45) Date of Patent: Feb. 22, 2011

(54) INTERNET SEARCHING USING SEMANTIC DISAMBIGUATION AND EXPANSION

(75) Inventors: Matthew Colledge, Montreal (CA); Jeremy Barnes, Montreal (CA)

(73) Assignee: Idilia Inc., Montreal (CA)

( * ) Notice: Subject to any disclaimer, the term of this patent is extended or adjusted under 35 U.S.C. 154(b) by 295 days.

(21) Appl. No.: 10/921,820

(22) Filed: Aug. 20, 2004

(65) Prior Publication Data

US 2005/0080776 A1 Apr. 14, 2005

Related U.S. Application Data

(60) Provisional application No. 60/496,681, filed on Aug. 21, 2003.

(51) Int. Cl.
*G06F 17/30* (2006.01)
*G06F 7/00* (2006.01)

(52) U.S. Cl. .................. 707/758; 707/767; 707/771

(58) Field of Classification Search .............. 707/1–5, 707/713, 715, 736, 738, 758, 759, 765, 766, 707/767, 771, 999.003, 999.004, 999.005
See application file for complete search history.

(56) References Cited

U.S. PATENT DOCUMENTS

| | | | |
|---|---|---|---|
| 5,237,503 A | 8/1993 | Bedecarrax et al. |
| 5,317,507 A | 5/1994 | Gallant |
| 5,325,298 A | 6/1994 | Gallant |
| 5,477,451 A | 12/1995 | Brown et al. |
| 5,510,981 A | 4/1996 | Berger et al. |
| 5,519,786 A | 5/1996 | Courtney et al. |
| 5,541,836 A | 7/1996 | Church et al. |
| 5,675,819 A | 10/1997 | Schuetze |
| 5,768,603 A | 6/1998 | Brown et al. |
| 5,794,050 A | 8/1998 | Dahlgren et al. |
| 5,805,832 A | 9/1998 | Brown et al. |
| 5,873,056 A | 2/1999 | Liddy et al. |
| 5,907,839 A | 5/1999 | Doth |
| 5,996,011 A | 11/1999 | Humes |
| 6,038,560 A | 3/2000 | Wical |
| 6,070,134 A | 5/2000 | Richardson et al. |
| 6,076,088 A | 6/2000 | Paik et al. |
| 6,078,878 A | 6/2000 | Dolan |

(Continued)

FOREIGN PATENT DOCUMENTS

EP 597630 A1 5/1994

(Continued)

*Primary Examiner*—Angela M Lie
(74) *Attorney, Agent, or Firm*—Santosh K. Chari; Blake, Cassels & Graydon LLP (57) ABSTRACT

The invention provides a system and a method of searching for information in a database using a query. In the method, it comprises the steps of: disambiguating the query to identify keyword senses associated with the query; disambiguating information in the database according to the keyword senses; indexing the information in the database according to the keyword senses; expanding the keyword senses to include relevant semantic synonyms for the keyword senses to create a list of expanded keyword senses; searching the database to find relevant information for the query using the expanded keyword senses; and providing search results of the included information containing the keyword senses and other semantically related words senses. The system comprises modules which disambiguate queries and information and indexes the information in a database of word senses.

15 Claims, 5 Drawing Sheets

U.S. PATENT DOCUMENTS

| | | |
|---|---|---|
| 6,081,775 A | 6/2000 | Dolan |
| 6,088,692 A | 7/2000 | Driscoll |
| 6,092,034 A | 7/2000 | McCarley et al. |
| 6,098,033 A | 8/2000 | Richardson et al. |
| 6,098,065 A | 8/2000 | Skillen et al. |
| 6,105,023 A | 8/2000 | Callan |
| 6,138,085 A | 10/2000 | Richardson et al. |
| 6,253,170 B1 | 6/2001 | Dolan |
| 6,256,629 B1 | 7/2001 | Sproat et al. |
| 6,260,008 B1 | 7/2001 | Sanfilippo |
| 6,366,908 B1 | 4/2002 | Chong et al. |
| 6,405,162 B1 | 6/2002 | Segond et al. |
| 6,421,675 B1 | 7/2002 | Ryan et al. |
| 6,453,315 B1 | 9/2002 | Weissman et al. |
| 6,480,843 B2 * | 11/2002 | Li ................. 1/1 |
| 6,631,371 B1 * | 10/2003 | Lei et al. ............... 707/694 |
| 6,636,848 B1 * | 10/2003 | Aridor et al. ........... 707/728 |
| 6,816,857 B1 * | 11/2004 | Weissman et al. ........ 707/5 |
| 7,089,236 B1 * | 8/2006 | Stibel ...................... 707/5 |
| 2002/0026456 A1 | 2/2002 | Bradford |
| 2002/0147724 A1 | 10/2002 | Fries et al. |
| 2003/0028367 A1 | 2/2003 | Chalabi |
| 2003/0069880 A1 * | 4/2003 | Harrison et al. ............ 707/3 |
| 2003/0078928 A1 * | 4/2003 | Dorosario et al. ......... 707/10 |
| 2003/0101182 A1 * | 5/2003 | Govrin et al. .............. 707/7 |
| 2005/0021397 A1 * | 1/2005 | Cui et al. .................. 705/14 |
| 2005/0027691 A1 * | 2/2005 | Brin et al. .................. 707/3 |
| 2005/0033771 A1 * | 2/2005 | Schmitter et al. ...... 707/104.1 |
| 2006/0026071 A1 * | 2/2006 | Radwin .................... 705/14 |
| 2006/0184521 A1 * | 8/2006 | Ponte ......................... 707/5 |
| 2008/0270393 A1 * | 10/2008 | Doganata et al. ............ 707/5 |

FOREIGN PATENT DOCUMENTS

| | | |
|---|---|---|
| EP | 1061465 A2 | 12/2000 |
| EP | 597630 B1 | 7/2002 |
| WO | WO 01/42984 A1 | 6/2001 |
| WO | WO 02/10985 A2 | 2/2002 |
| WO | WO 02/17128 A1 | 2/2002 |
| WO | WO 02/99700 A1 | 12/2002 |

* cited by examiner

Knowledge base 400

Nodes Table 402

| Id 406 | Type 408 | Annotations 410 |
|---|---|---|
| bank 406A | word 408A | |
| LABEL001 408B | Fine Sense 408B | Noun, A financial institution 410B |
| LABEL002 | Fine Sense | Noun, sloping land or shoreline |
| LABEL003 | Fine Sense | Noun, A building in which commercial banking is transacted |
| LABEL004 | Fine Sense | Verb, to do business with a bank |
| LABEL005 | Coarse Sense | |
| deposit | word | |
| LABEL006 | Fine Sense | Noun, a facility where things can be deposited for storage or safe keeping |

Edge/Relations Table 404

| From node ID 412 | To node ID 414 | type 416 | Annotations 418 |
|---|---|---|---|
| bank | LABEL001 | Word to Fine Sense | 1 |
| bank | LABEL002 | Word to Fine Sense | 2 |
| bank | LABEL003 | Word to Fine Sense | 4 |
| bank | LABEL004 | Word to Fine Sense | 3 |
| bank | LABEL 005 | Word to Coarse Sense | |
| LABEL005 | LABEL001 | Coarse to Fine Sense | |
| LABEL005 | LABEL003 | Coarse to Fine Sense | |
| LABEL005 | LABEL004 | Coarse to Fine Sense | |
| deposit | LABEL006 | Word to Fine Sense | 8 |
| LABEL006 | LABEL003 | Hyponym | |

Figure 4

INTERNET SEARCHING USING SEMANTIC DISAMBIGUATION AND EXPANSION

RELATED APPLICATION

This application claims the benefit of U.S. Provisional Application No. 60/496,681 filed on Aug. 21, 2003.

FIELD OF THE INVENTION

The present invention relates to Internet searching, and more particularly to Internet searching using semantic disambiguation and expansion.

BACKGROUND

When working with large sets of data, such as a database of documents or web pages on the Internet, the volume of available data can make it difficult to find information of relevance. Various methods of searching are used in an attempt to find relevant information in such stores of information. Some of the best known systems are Internet search engines, such as Yahoo (trademark) and Google (trademark) which allow users to perform keyword-based searches. These searches typically involve matching keywords entered by the user with keywords in an index of web pages.

However, existing Internet search methods often produce results that are not particularly useful. The search may return many results, but only a few or none may be relevant to the user's query. On the other hand, the search may return only a small number of results, none of which are precisely what the user is seeking while having failed to return potentially relevant results.

One reason for some difficulties encountered in performing such searches is the ambiguity of words used in natural language. Specifically, difficulties are often encountered because one word can have several meanings. This difficulty has been addressed in the past by using a technique called word sense disambiguation, which involves changing words into word senses having specific semantic meanings. For example, the word "bank" could have the sense of "financial institution" attached to it, or another definition.

U.S. Pat. No. 6,453,315 teaches meaning based information organization and retrieval. This patent teaches creating a semantic space by a lexicon of concepts and relations between concepts. Queries are mapped to meaning differentiators which represent the location of the query and the semantic space. Searching is accomplished by determining a semantic difference between differentiators to determine closeness and meaning. This system relies upon the user to refine the search based on the meanings determined by the system or alternatively to navigate through nodes found in the search results.

As known in the art, the evaluation of the efficiency of information retrieval is quantified by "precision" and "recall". Precision is quantified by dividing the number of correct results found in a search by the total number of results. Recall is quantified by dividing the number of correct results found in a search by the total number of possible correct results. Perfect (i.e. 100%) recall may be obtained simply by returning all possible results, except of course, this will give very poor precision. Most existing systems strive to balance the criteria of precision and recall. Increasing recall, for example by providing more possible results by use of synonyms, can consequentially reduce precision. On the other hand, increasing precision by narrowing the search results, for example by selecting results that match the exact sequence of words in a query, can reduce recall.

There is a need for a query processing system and method which addresses deficiencies in the prior art.

SUMMARY OF THE INVENTION

According to one aspect of the present invention, there is provided a method of searching information comprising the steps of disambiguating a query, disambiguating and indexing information according to keyword senses, searching the indexed information to find information relevant to the query using keyword senses in the query and other word senses which are semantically related to the keyword senses in the query, and returning search results which include information containing the keyword senses and other semantically related words senses.

The method may be applied to any database which is indexed using keywords. Preferably, the method is applied to a search of the Internet.

The semantic relations may be any logically or syntactically defined type of association between two words. Examples of such associations are synonymy, hyponymy etc.

The step of disambiguating the query may include assigning probability to word senses. Similarly, the step of disambiguating the information may include attaching probabilities to word senses.

The keyword senses used in the method may be coarse groupings of finer word senses.

In a further aspect, a method of searching for information in a database using a query is provided. The method comprising the steps of: disambiguating information in the database according to the keyword senses; indexing the information in the database according to the keyword senses; disambiguating the query to identify keyword senses associated with the query; expanding the keyword senses to include relevant semantic relations for the keyword senses to create a list of expanded keyword senses; searching the database to find relevant information for the query using the expanded keyword senses; and providing search results of the included information containing the keyword senses and other semantically related words senses.

In the method, disambiguating the information in the database may comprise attaching probabilities to keyword senses. The words in the information may be indexed with multiple senses and the probability of the sense may be stored with it in the index.

In the method, disambiguating the query may comprise assigning a probability to the keyword senses.

In the method, disambiguating the query to identify specific keyword senses may further comprise utilizing probabilities of each of said specific keyword senses.

In the method, expanding the specific keyword senses may further comprise paraphrasing the query by parsing syntactic structures of the specific keyword sense and identifying additional semantically equivalent queries.

In the method, the keyword senses may represent a coarse grouping of fine keyword senses.

In another aspect, a system for providing information from a database responsive a query, is provided. The system comprises: a database containing data to be search by the query; an indexing module to create a reference index for the data to be used by the query; a query processing module to apply the query to the database; and a disambiguation module for disambiguating the query to identify keyword senses associated with the query. In particular for the system: the disambiguation module disambiguates information in the database according to the keyword senses; the indexing module indexes the information in the database according to the keyword senses; and the query processing modules expands the keyword senses to include relevant semantic synonyms for the keyword senses to create a list of expanded keyword senses, initiates a search of the database to find relevant information for the query using the expanded keyword senses; and provides search results of the include information containing the keyword senses and other semantically related words senses.

In the system the disambiguation module may assign a probability to the keyword senses to rank the keyword senses. The words in the information may be indexed with multiple senses and the probability of the sense may be stored with it in the index In the system the keyword senses may represent a coarse grouping of fine keyword senses.

The system may also incorporate other functionalities of aspects noted with the method described above.

In other aspects various combinations of sets and subsets of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DESCRIPTION OF THE EMBODIMENTS

The description which follows, and the embodiments described therein, are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

The following terms will be used in the following description, and have the meanings shown below:

Computer readable storage medium: hardware for storing instructions or data for a computer. For example, magnetic disks, magnetic tape, optically readable medium such as CD ROMs, and semi-conductor memory such as PCMCIA cards. In each case, the medium may take the form of a portable item such as a small disk, floppy diskette, cassette, or it may take the form of a relatively large or immobile item such as hard disk drive, solid state memory card, or RAM.

Information: documents, web pages, emails, image descriptions, transcripts, stored text etc. that contain searchable content of interest to users, for example, contents related to news articles, news group messages, web logs, etc.

Module: a software or hardware component that performs certain steps and/or processes; may be implemented in software running on a general-purpose processor.

Natural language: a formulation of words intended to be understood by a person rather than a machine or computer.

Network: an interconnected system of devices configured to communicate over a communication channel using particular protocols. This could be a local area network, a wide area network, the Internet, or the like operating over communication lines or through wireless transmissions.

Query: a list of keywords indicative of desired search results; may utilize Boolean operators (e.g. "AND", "OR"); may be expressed in natural language.

Query module: a hardware or software component to process a query.

Search engine: a hardware or software component to provide search results regarding information of interest to a user in response to a query from the user. The search results may be ranked and/or sorted by relevance.

Figure 1:
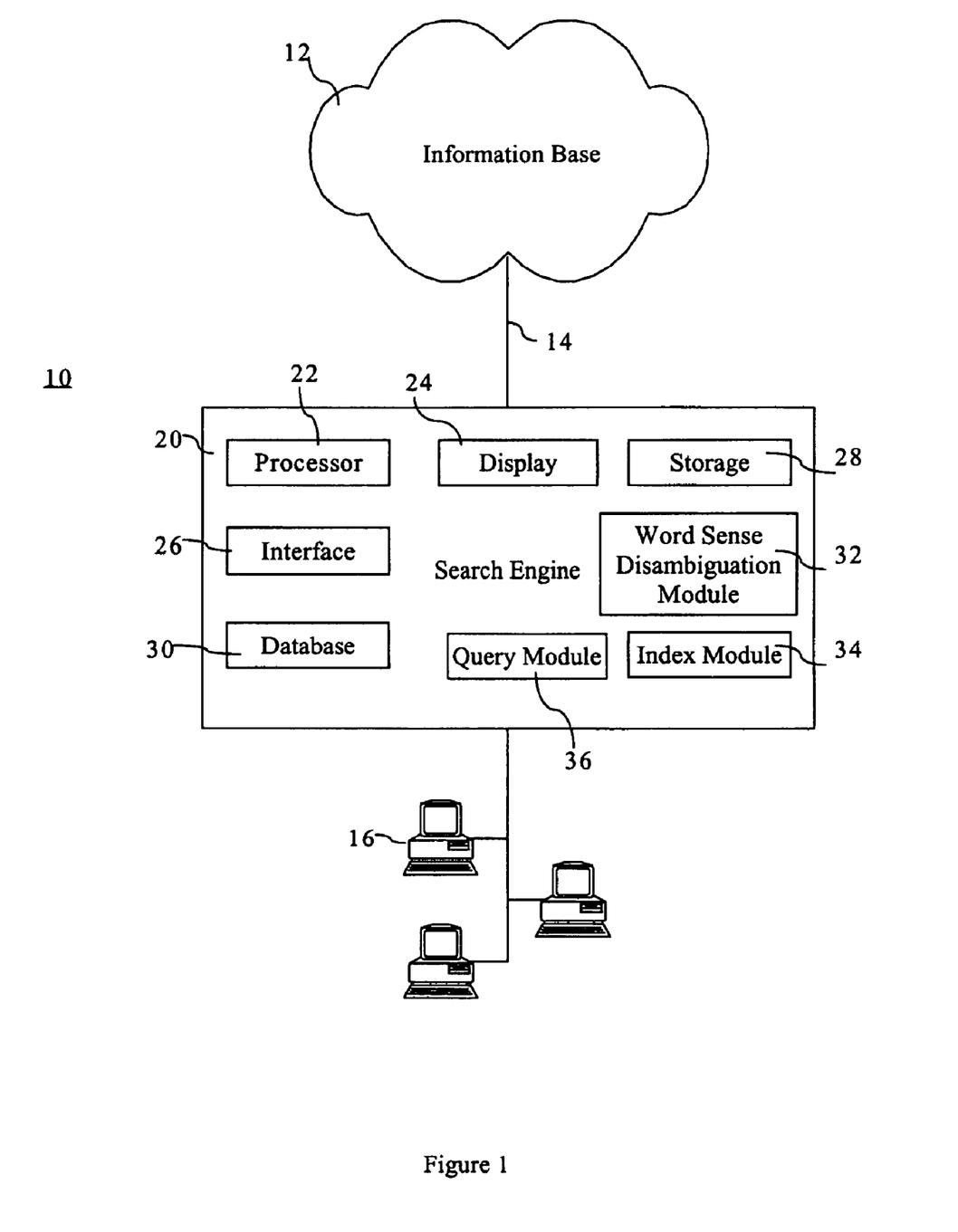
FIG. 1 is a schematic representation of an information retrieval system providing word sense disambiguation associated with an embodiment of the invention.

Referring to FIG. 1, an information retrieval system associated with an embodiment is shown generally by the number 10. The system includes a store of information 12 which is accessible through a network 14. Other methods of access known in the art may also be used. The store of information 12 may include documents, web pages, databases, and the like. Preferably, the network 14 is the Internet, and the store of information 12 comprises web pages. When the network 14 is the Internet, the protocols include TCP/IP (Transmission Control Protocol/Internet Protocol). Various clients 16 are connected to the network 14, by a wire in the case of a physical network or through a wireless transmitter and receiver. Each client 16 includes a network interface as will be understood by those skilled in the art. The network 14 provides the clients 16 with access to the content within the store of information 12. To enable the clients 16 to find particular information, documents, web pages, or the like within the store of information 12, the system 10 is configured to allow the clients 16 to search for information by submitting queries. The queries contain at least a list of keywords and may also have structure in the form of Boolean relationships such as "AND" and "OR." The queries may also be structured in natural language as a sentence or question.

The system includes a search engine 20 connected to the network 14 to receive the queries from the clients 16 to direct them to individual documents within the store of information 12. The search engine 20 may be implemented as dedicated hardware, or as software operating on a general purpose processor. The search engine operates to locate documents within the store of information 12 that are relevant to the query from the client.

The search engine 20 generally includes a processor 22. The engine may also be connected, either directly thereto, or indirectly over a network or other such communication means, to a display 24, an interface 26, and a computer readable storage medium 28. The processor 22 is coupled to the display 24 and to the interface 26, which may comprise user input devices such as a keyboard, mouse, or other suitable devices. If the display 24 is touch sensitive, then the display 24 itself can be employed as the interface 26. The computer readable storage medium 28 is coupled to the processor 22 for providing instructions to the processor 22 to instruct and/or configure processor 22 to perform steps or algorithms related to the operation of the search engine 20, as further explained below. Portions or all of the computer readable storage medium 28 may be physically located outside of the search engine 28 to accommodate, for example, very large amounts of storage. Persons skilled in the art will appreciate that various forms search engines can be used with the present invention.

Optionally, and for greater computational speed, the search engine 20 may include multiple processors operating in parallel or any other multi-processing arrangement. Such use of multiple processors may enable the search engine 20 to divide tasks among various processors. Furthermore, the multiple processors need not be physically located in the same place, but rather may be geographically separated and interconnected over a network as will be understood by those skilled in the art.

Preferably, the search engine 20 includes a database 30 for storing an index of word senses and for storing a knowledge base used by search engine 20. The database 30 stores the index in a structured format to allow computationally efficient storage and retrieval as will be understood by those skilled in the art. The database 30 may be updated by adding additional keyword senses or by referencing existing keyword senses to additional documents. The database 30 also provides a retrieval capability for determining which documents contain a particular keyword sense. The database 30 may be divided and stored in multiple locations for greater efficiency.

According to an embodiment, the search engine 20 includes a word sense disambiguation module 32 for processing words in an input document or a query into word senses. A word sense is a given interpretation ascribed to a word, in view of the context of its usage and its neighbouring words. For example, the word "book" in the sentence "Book me a flight to New York" is ambiguous, because "book" can be a noun or a verb, each with multiple potential meanings. The result of processing of the words by the disambiguation module 32 is a disambiguated document or disambiguated query comprising word senses rather than ambiguous or uninterpreted words. The input document may be any unit of information in the store of information, or one of the queries received from clients. The word sense disambiguation module 32 distinguishes between word senses for each word in the document or query. The word sense disambiguation module 32 identifies which specific meaning of the word is the intended meaning using a wide range of interlinked linguistic techniques to analyze the syntax (e.g. part of speech, grammatical relations) and semantics (e.g. logical relations) in context. It may use a knowledge base of word senses which expresses explicit semantic relationships between word senses to assist in performing the disambiguation. The knowledge base may include relationships as described below with reference to FIGS. 3A and 3B.

The search engine 20 includes an indexing module 34 for processing a disambiguated document to create the index of keyword senses and storing the index in the database 30. The index includes an entry for each keyword sense relating to the documents in which it may be found. The index is preferably sorted and includes an indication of the locations of each indexed keyword sense. The index module 34 creates the index by processing the disambiguated document and adding each keyword sense to the index. Certain keywords may appear too many times to be useful and/or may contain very little semantic information, such as "a" or "the". These keywords may not be indexed.

The search engine 20 also includes a query module 36 for processing queries received from client 16. The query module 36 is configured to receive queries and transfer them to the disambiguation module 32 for processing. The query module 36 then finds results in the index that are relevant to the disambiguated query, as described further below. The results contain keyword senses semantically related to the word senses in the disambiguated query. The query module 36 provides the results to the client. The results may be ranked and/or scored for relevance to assist the client in interpreting them.

Figure 2:
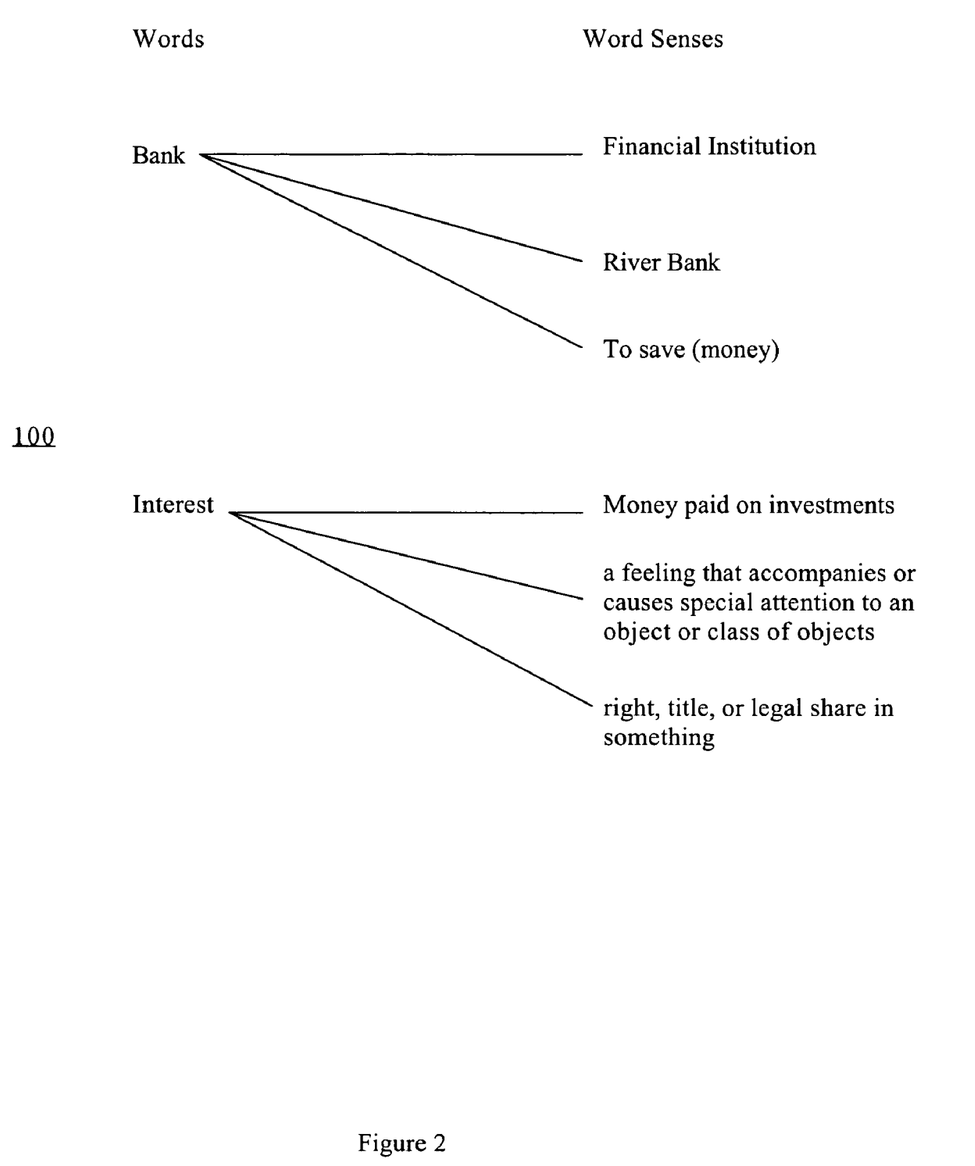
FIG. 2 is a schematic representation of words and word senses associated with the system of FIG. 1.

Referring to FIG. 2, the relationship between words and word senses is shown generally by the reference 100. As seen in this example, certain words have multiple senses. Among many other possibilities, the word "bank" may represent: (i) a noun referring to a financial institution; (ii) a noun referring to a river bank; or (iii) a verb referring to an action to save money. The word sense disambiguation module 32 splits the ambiguous word "bank" into less ambiguous word senses for storage in the index. Similarly, the word "interest" has multiple meanings including: (i) a noun representing an amount of money payable relating to an outstanding investment or loan; (ii) a noun representing special attention given to something; or (iii) a noun representing a legal right in something.

Figure 3A:
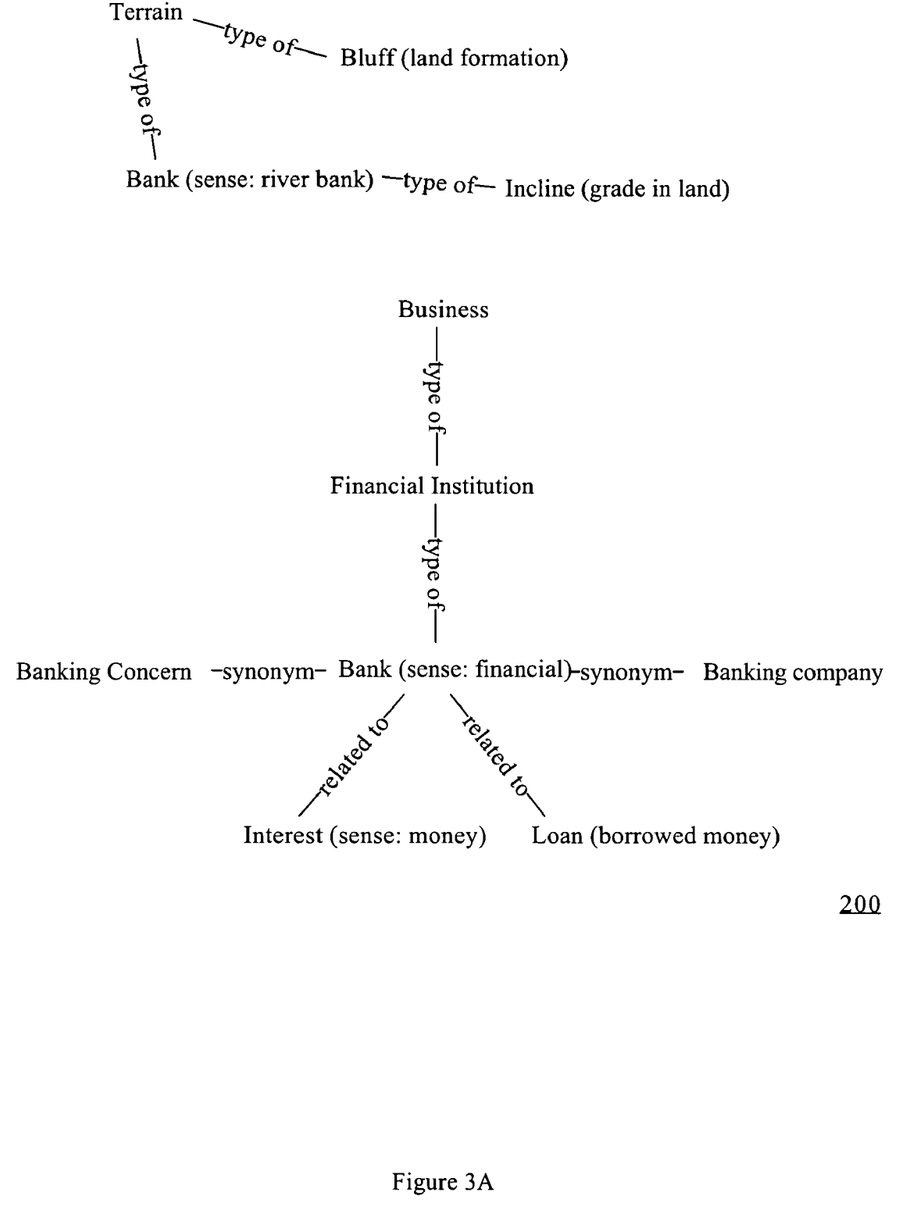
FIG. 3A is a schematic representation of a representative semantic relationship or words for with the system of FIG. 1.
Figure 3B:
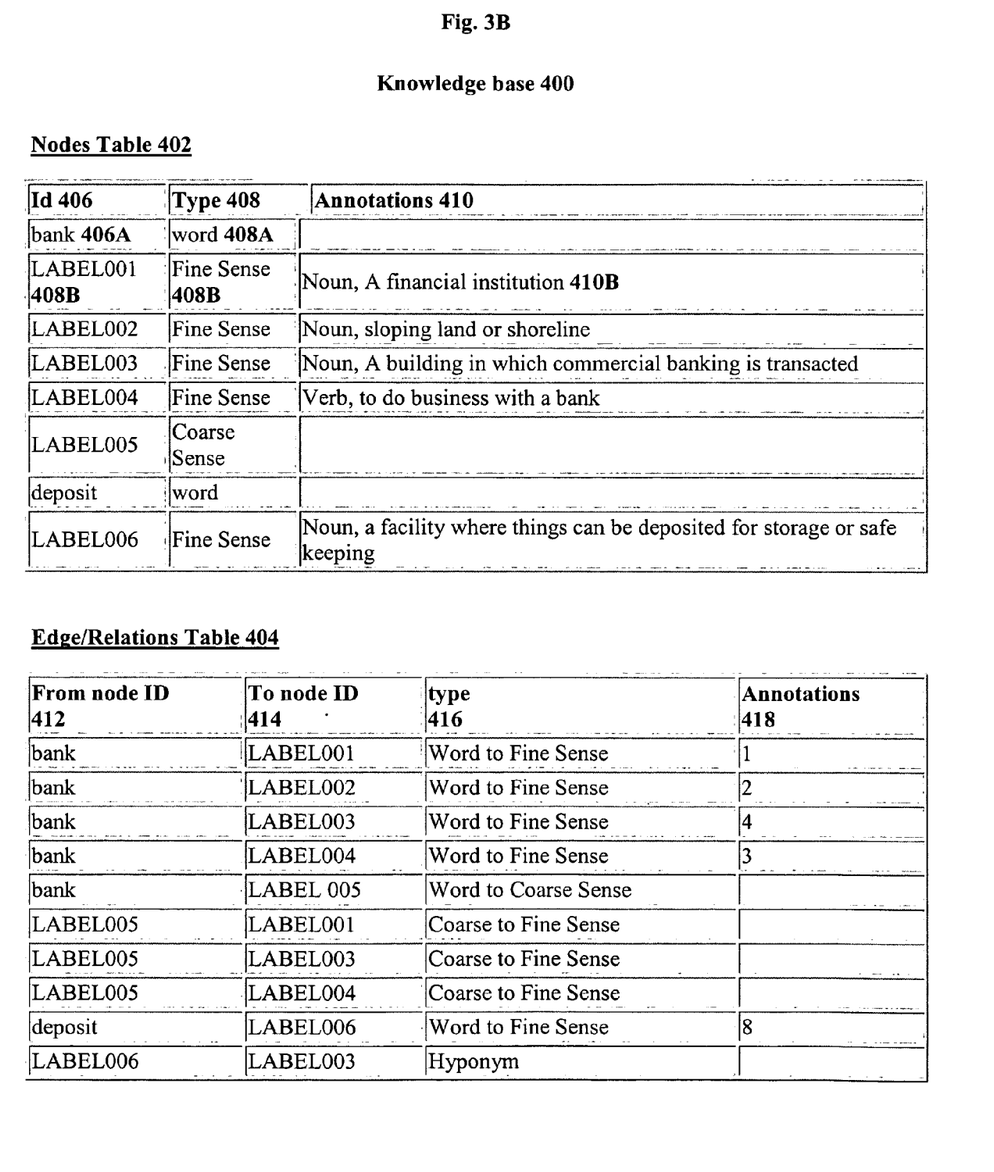
FIG. 3B is a diagram of data structures used to represent the semantic relationships of FIG. 3A for the system of FIG. 1.

Referring to FIGS. 3A and 3B, example semantic relationships between word senses are shown. These semantic relationships are precisely defined types of associations between two words based on meaning. The relationships are between word senses, that is specific meanings of words.

Specifically in FIG. 3A, for example, a bank (in the sense of a river bank) is a type of terrain and a bluff (in the sense of a noun meaning a land formation) is also a type of terrain. A bank (in the sense of river bank) is a type of incline (in the sense of grade of the land). A bank in the sense of a financial institution is synonymous with a "banking company" or a "banking concern." A bank is also a type of financial institution, which is in turn a type of business. A bank (in the sense of financial institution) is related to interest (in the sense of money paid on investments) and is also related to a loan (in the sense of borrowed money) by the generally understood fact that banks pay interest on deposits and charge interest on loans.

It will be understood that there are many other types of semantic relationships that may be used. Although known in the art, following are some examples of semantic relationships between words: Words which are in synonymy are words which are synonyms to each other. A hypernym is a relationship where one word represents a whole class of specific instances. For example "transportation" is a hypernym for a class of words including "train", "chariot", "dogsled" and "car", as these words provide specific instances of the class. Meanwhile, a hyponym is a relationship where one word is a member of a class of instances. From the previous list, "train" is a hyponym of the class "transportation". A meronym is a relationship where one word is a constituent part of, the substance of, or a member of something. For example, for the relationship between "leg" and "knee", "knee" is a meronym to "leg", as a knee is a constituent part of a leg. Meanwhile, a holonym a relationship where one word is the whole of which a meronym names a part. From the previous example, "leg" is a holonym to "knee". Any semantic relationships that fall into these categories may be used. In addition, any known semantic relationships that indicate specific semantic and syntactic relationships between word senses may be used.

It is known that there are ambiguities in interpretation when strings of keywords are provided as queries and that having an expanded list of keywords in a query increases the number of results found in the search. The embodiment provides a system and method to identify relevant, disambiguated lists of keywords for a query. Providing such a list delineated on the sense of words reduces the amount of extraneous information that is retrieved. The embodiment expands the query language without obtaining unrelated results due to extra senses of a word. For example, expanding the "financial institution" sense of bank will not also expand the other senses such as "river-bank" or "to save". This allows information management software to identify more precisely the information for which a client is looking.

Expanding a query involves using one or both of the following steps:

1. Adding to a disambiguated query keyword sense, any other word and its associated senses that are semantically related to the disambiguated keyword sense.

2. Paraphrasing the query by parsing its syntactic structure and transforming it into other semantically equivalent queries. The index contains fields that identify semantic dependencies between pairs of keyword senses that are derived from the syntactic structure of the information. Paraphrasing is a term and concept known in the art.

It will be recognized that the use of word sense disambiguation in a search addresses the problem of retrieval relevance. Furthermore, users often express queries as they would express language. However, since the same meaning can be described in many different ways, users encounter difficulties when they do not express a query in the same specific manner in which the relevant information was initially classified.

For example if the user is seeking information about "Java" the island, and is interested in "holidays" on Java (island), the user would not retrieve useful documents that had been categorized using the keywords "Java" and "vacation". It will be recognized that the semantic expansion feature, according to an embodiment, addresses this issue. It has been recognized that deriving precise synonyms and sub-concepts for each key term in a naturally expressed query increases the volume of relevant retrievals. If this were performed using a thesaurus without word sense disambiguation, the result could be worsened. For example, semantically expanding the word "Java" without first establishing its precise meaning would yield a massive and unwieldy result set with results potentially selected based on word senses as diverse as "Indonesia" and "computer programming". It will be recognized that the described methods of interpreting the meaning of each word and then semantically expanding that meaning returns a more comprehensive and simultaneously more target result set.

Referring to FIG. 3B, to assist in disambiguating such word senses, the embodiment utilizes knowledge base 400 of word senses capturing relationships of words as described above for FIG. 3A. Knowledge base 400 is associated with database 30 and is accessed to assist WSD module 32 in performing word sense disambiguation. Knowledge base 400 contains definitions of words for each of their word senses and also contains information on relations between pairs of word senses. These relations includes the definition of the sense and the associated part of speech (noun, verb, etc.), fine sense synonyms, antonyms, hyponyms, meronyms, pertainyms, similar adjectives relations and other relationships known in the art. While prior art electronic dictionaries and lexical databases, such as WordNet (trademark), have been used in systems, knowledge base 400 provides an enhanced inventory of words and relations. Knowledge base 400 contains: (i) additional relations between word senses, such as the grouping of fine senses into coarse senses, new types of inflectional and derivational morphological relations, and other special purpose semantic relations; (ii) large-scale corrections of errors in data obtained from published sources; and (iii) additional words, word senses, and associated relations that are not present in other prior art knowledge bases.

In the embodiment, knowledge base 400 is a generalized graph data structure and is implemented as a table of nodes 402 and a table of edge relations 404 associating connecting two nodes. Each is described in turn. In other embodiments, other data structures, such as linked lists, may be used to implement knowledge base 400.

In table 402, each node is an element in a row of table 402. A record for each node may have as many as the following fields: an ID field 406, a type field 408 and an annotation field 410. There are two types of entries in table 402: a word and a word sense definition. For example, the word "bank" in ID field 406A is identified as a word by the "word" entry in type field 408A. Also, exemplary table 402 provides several definitions of words. To catalog the definitions and to distinguish definition entries in table 402 from word entries, labels are used to identify definition entries. For example, entry in ID field 406B is labeled "LABEL001". A corresponding definition in type field 408B identifies the label as a "fine sense" word relationship. A corresponding entry in annotation filed 410B identifies the label as "Noun. A financial institution". As such, a "bank" can now be linked to this word sense definition. Furthermore an entry for the word "brokerage" may also be linked to this word sense definition. Alternate embodiments may use a common word with a suffix attached to it, in order to facilitate recognition of the word sense definition. For example, an alternative label could be "bank/n1", where the "/n1" suffix identifies the label as a noun (n) and the first meaning for that noun. It will be appreciated that other label variations may be used. Other identifiers to identify adjectives, adverbs and others may be used. The entry in type field 408 identifies the type associated with the word. There are several types available for a word, including: word, fine sense and coarse sense. Other types may also be provided. In the embodiment, when an instance of a word has a fine sense, that instance also has an entry in annotation field 410 to provide further particulars on that instance of the word.

Edge/Relations table 404 contains records indicating relationships between two entries in nodes table 402. Table 404 has the following entries: From node ID column 412, to node ID column 414, type column 416 and annotation column 418. Columns 412 and 414 are used to link to entries in table 402 together. Column 416 identifies the type of relation that links the two entries. record has the ID of the origin and the destination node, the type of the relation, and may have annotations based on the type. Type of relations include "root word to word", "word to fine sense", "word to coarse sense", "coarse to fine sense", "derivation", "hyponym", "category", "pertainym", "similar", "has part". Other relations may also be tracked therein. Entries in annotation column 418 provide a (numeric) key to uniquely identify an edge type going from a word node to either a coarse node or fine node for a given part-of-speech.

Figure 4:
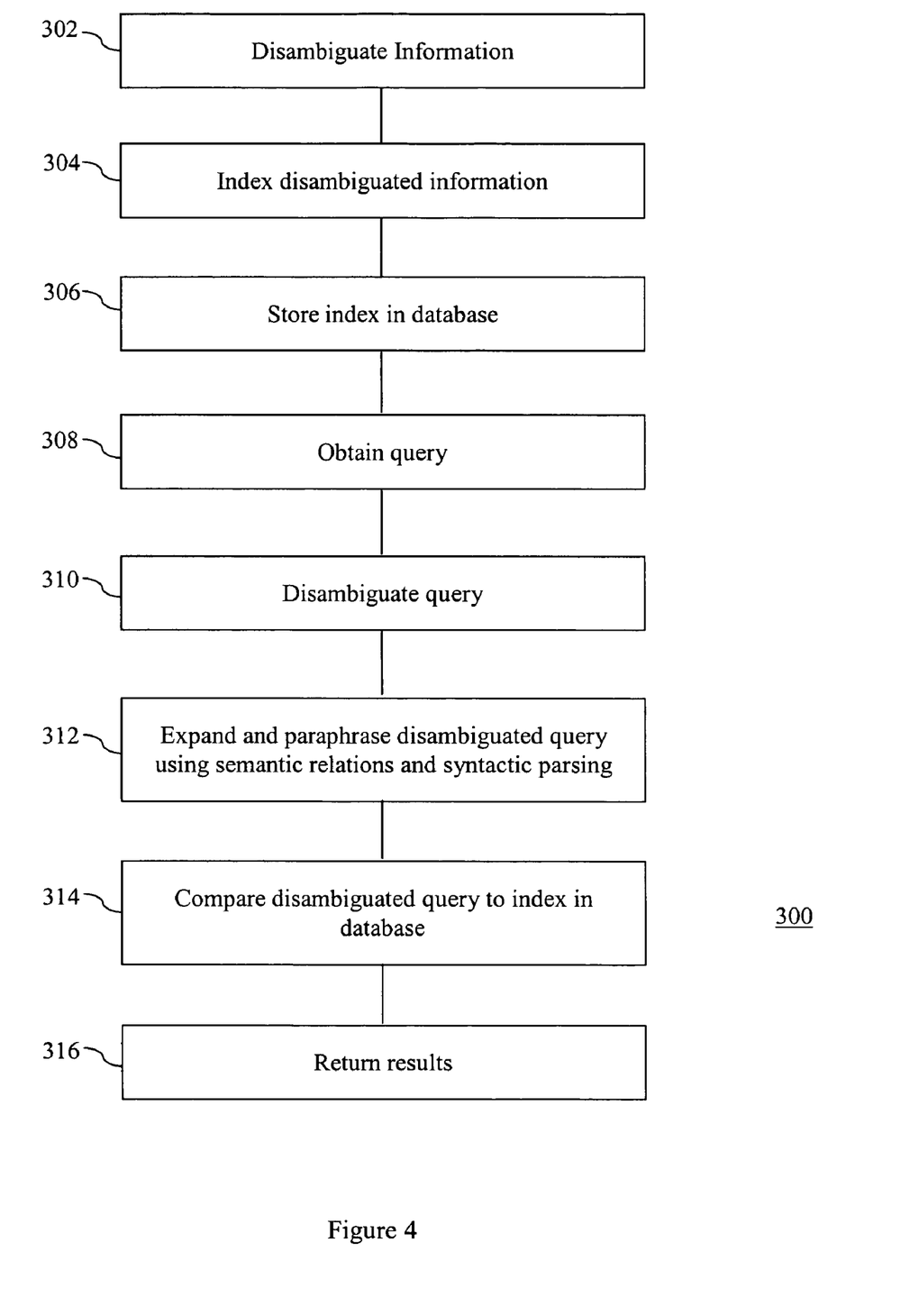
FIG. 4 is a flow diagram of a method performed by the system of FIG. 1 using the word senses of FIG. 2 and the semantic relationships of FIG. 3A.

Further detail is now provided on steps performed by the embodiment to perform a search utilizing results from disambiguating a word associated with a query. Referring to FIG. 4, a process perform such a search is shown generally by the reference 300. The process may be divided into two general stages. The first stage comprises pre-processing the information (or a subset of the information) to facilitate the second stage of responding to a query. In the first stage of pre-processing, each document in the store of information (or a subset of the store of information) is summarized to create the index in the database. At step 302, the word sense disambiguation module 32 distinguishes between word senses for each word in each document. The word sense disambiguation module 32 was defined above.

The search engine then applies the index module to the disambiguated information at step 304 to obtain an index of keyword senses. The index module 34 creates the index by processing the disambiguated document and adding each keyword sense to the index. Certain keywords may appear too many times to be useful, such as "a" or "the". Preferably, these keywords are not indexed. It will be recognized that this step effectively indexes one word as several different word senses. This index of word senses is stored in the database at step 306.

In the second stage of the process, the search engine receives a query from one of the clients at step 308. The query is parsed into its word components and then each word can be analyzed for its context alone and in context with its neighbouring words. Parsing techniques for strings of words are known in the art and are not repeated here. The word sense disambiguation module 32 distinguishes between meanings for each word in the query at step 310.

In the preferred embodiment, as shown at step 312, using knowledge base 400 (FIG. 3B), the search engine expands and paraphrases the disambiguated query to include keyword senses which are semantically related to the specific keyword senses in the query. The expansion is performed on the basis of word sense and accordingly produces a list of word senses which are related to the meaning of the query. The semantic relationships may be those described above with reference to FIGS. 3A and 3B.

The search engine then compares the disambiguated and expanded query to word sense information in the database at step 314. Entries in the knowledge base whose word senses match the keyword senses in the query are selected to be results. As noted earlier, the knowledge base includes a database of indexed documents. The search engine then returns results to the client at step 316. In one embodiment, the results may be weighted according to the semantic relationship between the word senses found in the results and that of the keywords in the query. Thus, for example, a result containing a word sense with a synonymous relationship to the keyword senses in the query may be given a higher weighting as compared to a result containing word senses with a hyponym relationship. The results may also be weighted by a probability that a keyword sense in the disambiguated query and/or disambiguated document is correct. The results may also be weighted by other features of the document or web page corresponding to the results such as the frequency of the relevant word senses or their location in relation to each other, or other techniques for ranking results as will be understood by persons skilled in the art.

It will be recognized that the first stage of the process may be performed as a pre-computation step, prior to interaction with the clients. The second stage could be performed several times without repeating the first stage. The first stage may be performed occasionally, or at regular intervals to maintain currency of the database. The database could also be updated incrementally by choosing performing the first stage on subsets of the information, such as newly added or modified information.

Although the invention has been described with reference to certain specific embodiments, various modifications thereof will be apparent to those skilled in the art without departing from the scope of the invention as outlined in the claims appended hereto. A person skilled in the art would have sufficient knowledge of at least one or more of the following disciplines: computer programming, machine learning and computational linguistics.

We claim:

1. A computer based method of searching for information in a database using a query, said method comprising the steps of:
    a) disambiguating information in a store of information, said information comprising documents containing text, to identify information keyword meanings, said information keyword meanings comprising meanings of words contained in each respective document and in the context in which said words are used in the respective documents, wherein said disambiguation step is executed by a disambiguation module that comprises encoded linguistic algorithms for analyzing both the syntax and the semantics of an input text, and is associated with a knowledge base containing semantic relationships between word meanings, the disambiguation module being operable to identify contextual meanings of words in the input text; and,
    indexing said documents in said database according to said information keyword meanings;
    and,
    b) disambiguating said query using said disambiguation module to identify query keyword meanings, said query keyword meanings comprising meanings of words contained in said query and in the context in which said words are used in the query;
    automatically expanding said query keyword meanings, without user intervention, using a query processing module operable to identify other word meanings that are semantically related to the query keyword meanings and to create a list of expanded query keyword meanings, wherein said list comprises the query keyword meanings and the identified semantically related word meanings;
    searching said database to identify matches between the expanded query keyword meanings and the indexed information keyword meanings;
    identifying documents associated with the matched information keyword meanings, said identified documents comprising information relevant to said query; and
    providing search results comprising the information relevant to said query.

2. The method of claim 1 wherein steps (a) and (b) are conducted independently of each other.

3. The method of claim 2, wherein disambiguating said documents comprises assigning probabilities to said information keyword meanings.

4. The method of claim 2 wherein the step of searching said database further comprises using probabilities of said query keyword meanings when identifying matches between the expanded query keyword meanings and the information keyword meanings.

5. The method of claim 2 wherein said step of expanding the query keyword meanings further comprises paraphrasing said query by parsing the syntactic structure of said query and transforming it into additional semantically equivalent queries using the original query keyword meanings or the expanded query keyword meanings.

6. The method of claim 5, wherein said keyword meanings represent a coarse grouping of fine keyword meanings.

7. The method of claim 2, wherein said keyword meanings represent a coarse grouping of fine keyword meanings.

8. A system for providing information from a database responsive to a query, said system comprising:
    an input means operable to receive said query;
    an output means operable to provide results responsive to said query;

a database containing information to be searched by said query, said information comprising documents containing text;

an indexing module to create a reference index for said information to be used by said query;

a query processing module to apply said query to said database;

a disambiguation module for disambiguating words contained in the documents and the query into information and query keyword meanings, respectively, the disambiguation module comprising encoded linguistic algorithms for analyzing both the syntax and the semantics of an input text, and being associated with a knowledge base containing semantic relationships between word meanings, the disambiguation module being operable to identify contextual meanings of words in the input text; wherein, said disambiguation module being operable to disambiguate said documents to identify information keyword meanings, said information keyword meanings comprising meanings of words contained in each respective document and in the context in which said words are used in the respective documents;

said indexing module being operable to index the documents in said database according to said information keyword meanings;

said disambiguation module being further operable to disambiguate said query to identify query keyword meanings, said query keyword meanings comprising meanings of words contained in the query and in the context in which said words are used in the query;

said query processing module being operable to:

automatically expand said query keyword meanings, without user intervention, by automatically identifying other word meanings that are semantically related to the query keyword meanings and to create a list of expanded query keyword meanings;

search said database to find relevant information for said query by matching the expanded query keyword meanings to the information keyword meanings indexed in said database, wherein said relevant information comprises documents in said database associated with the matched information keyword meanings;

and provide search results comprising said relevant information.

9. The system as claimed in claim 8, wherein said disambiguation module ranks said query keyword meanings based on semantic relationships between the query keyword meanings and the matched information keyword meanings.

10. The system as claimed in claim 9, wherein said keyword meanings represent a coarse grouping of fine keyword meanings.

11. The method of claim 2, wherein disambiguating the query comprises assigning probabilities to said query keyword meanings.

12. The method of claim 2 wherein said steps of disambiguation include using a knowledge base of semantic relationships between word meanings.

13. The method of claim 2 wherein said results are weighted based on semantic relationships between the query keyword meanings and the matched information keyword meanings.

14. The method of claim 2 wherein said results are weighted based on probabilities assigned to the query keyword meanings and on probabilities assigned to those same meanings among the matched information keyword meanings.

15. The method of claim 3 wherein the step of searching said database further comprises using probabilities of said information keyword meanings when identifying matches between the query keyword meanings and the information keyword meanings.

* * * * *